(12) United States Patent
Quinn

(10) Patent No.: US 9,921,384 B2
(45) Date of Patent: *Mar. 20, 2018

(54) ULTRA-HIGH FIBER DENSITY MICRO-DUCT CABLE WITH EXTREME OPERATING PERFORMANCE

(71) Applicant: AFL Telecommunications LLC, Duncan, SC (US)

(72) Inventor: Justin Quinn, Boiling Springs, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,627

(22) Filed: Nov. 4, 2016

(65) Prior Publication Data

US 2017/0082817 A1    Mar. 23, 2017

Related U.S. Application Data

(63) Continuation of application No. 15/088,257, filed on Apr. 1, 2016, now Pat. No. 9,557,506.

(60) Provisional application No. 62/141,503, filed on Apr. 1, 2015.

(51) Int. Cl.
*G02B 6/44* (2006.01)

(52) U.S. Cl.
CPC .......... *G02B 6/4463* (2013.01); *G02B 6/441* (2013.01); *G02B 6/443* (2013.01); *G02B 6/4434* (2013.01); *G02B 6/4436* (2013.01)

(58) Field of Classification Search
CPC .... G02B 6/4463; G02B 6/441; G02B 6/4434; G02B 6/4436; G02B 6/443

USPC .................................................. 385/100–113
See application file for complete search history.

(56) References Cited

U.S. PATENT DOCUMENTS

| 5,268,971 | A | 12/1993 | Nilsson et al. | |
|---|---|---|---|---|
| 6,633,709 | B2 | 10/2003 | VanVickle et al. | |
| 7,970,247 | B2 * | 6/2011 | Barker | G02B 6/4429 385/100 |
| 7,974,507 | B2 * | 7/2011 | Lovie | G02B 6/4411 385/100 |
| 8,929,701 | B2 * | 1/2015 | Lowell | G02B 6/4436 385/101 |

(Continued)

FOREIGN PATENT DOCUMENTS

WO    WO 2015/102819 A1    7/2015

OTHER PUBLICATIONS

AFL Telecommunications LLC, International Patent Application No. PCT/US16/25483; PCT International Search Report; Jun. 24, 2016:(1 page).

*Primary Examiner* — Ryan Lepisto
*Assistant Examiner* — Guy Anderson
(74) *Attorney, Agent, or Firm* — Dority & Manning, P.A.

(57) ABSTRACT

A micro-duct cable includes a center member and a plurality of buffer tubes surrounding the center member. A plurality of fibers are disposed in each of the plurality of buffer tubes. Each of the plurality of buffer tubes contains greater than or equal to 24 fibers. The micro-duct cable further includes a cable jacket surrounding the plurality of buffer tubes and the center member. A maximum outer diameter of the cable is less than 13 millimeters and a modulus of elasticity of the cable is greater than or equal to 800 kpsi.

18 Claims, 4 Drawing Sheets

(56) References Cited

U.S. PATENT DOCUMENTS

| | | | |
|---|---|---|---|
| 2003/0035635 A1 | 2/2003 | Chastain et al. | |
| 2004/0240811 A1* | 12/2004 | Weiss .................... | G02B 6/4429 385/113 |
| 2005/0201695 A1 | 9/2005 | Fee | |
| 2005/0213889 A1 | 9/2005 | Hurley et al. | |
| 2009/0087153 A1* | 4/2009 | Weiss .................... | G02B 6/4438 385/113 |
| 2009/0297107 A1* | 12/2009 | Tatat .................... | G02B 6/4403 385/114 |
| 2010/0067855 A1* | 3/2010 | Barker ................ | G02B 6/4429 385/109 |
| 2010/0067856 A1* | 3/2010 | Knoch .................. | G02B 6/441 385/111 |
| 2010/0067857 A1* | 3/2010 | Lovie .................. | G02B 6/4411 385/113 |
| 2011/0188041 A1* | 8/2011 | Martin-Regalado ... | G02B 6/443 356/405 |
| 2013/0209044 A1* | 8/2013 | Lowell .................. | G02B 6/443 385/101 |
| 2014/0226940 A1 | 9/2014 | Nexans | |

* cited by examiner

ULTRA-HIGH FIBER DENSITY MICRO-DUCT CABLE WITH EXTREME OPERATING PERFORMANCE

CROSS REFERENCE TO RELATED APPLICATIONS

This application is a continuation application of U.S. patent application Ser. No. 15/088,257, filed Apr. 1, 2016, which is based upon and claims the benefit of priority from U.S. Provisional Patent Application No. 62/141,503, filed Apr. 1, 2015, the disclosures of both of which are incorporated by reference herein in their entireties.

BACKGROUND

1. Technical Field

The present disclosure is related to an ultra-high density fiber optic micro-duct cable, and more particularly, to a cable which may include 288 fibers and which is configured to be inserted in a micro-duct having an inner diameter of 13 mm or less, and that is capable of withstanding high tensile and compressive loads and extreme temperature ranges.

2. Description of the Related Art

As the demand for bandwidth needed to support communications devices continues to increase, fiber networks continue to grow and expand. An existing method for installing fiber optic cables is to blow or jet the cable into a micro-duct. In these cases, the micro-duct limits the cable construction that can be installed. To overcome this, manufacturers have developed small diameter, lightweight cables with high fiber density for use in the ducts. However, as noted in Telcordia's Generic Requirements for Optical Fiber and Optical Fiber Cable (GR-20, Issue 4), "The small size of the micro-duct cables results in generally lower tensile strength, crush resistance, and the like." As such, technicians must take special care while installing traditional duct cables. Further, existing constructions of high fiber count cables often have a limited operating temperature range, so they are not suitable in extreme temperature environments. While some high count constructions are commercially available, their construction limits the operating performance, specifically the tensile load, compression resistance and operating temperature ranges.

SUMMARY

Exemplary embodiments of the present disclosure address the problems and/or disadvantages of the related art technology described above. Although the present invention is not required to overcome all of the disadvantages described above, the exemplary implementations of the present disclosure may address the above disadvantages, and further disadvantages not described above, or may not overcome any of the problems listed above while still providing enhancement to the related art.

In accordance with one embodiment, a micro-duct cable is provided. The micro-duct cable includes a center member and a plurality of buffer tubes surrounding the center member. A plurality of fibers are disposed in each of the plurality of buffer tubes. Each of the plurality of buffer tubes contains greater than or equal to 24 fibers. The micro-duct cable further includes a cable jacket surrounding the plurality of buffer tubes and the center member. A maximum outer diameter of the cable is less than 13 millimeters and a modulus of elasticity of the cable is greater than or equal to 800 kpsi.

In exemplary embodiments, each of the plurality of buffer tubes has an outer diameter of less than or equal to 3.1 millimeters and an inner diameter of less than or equal to 2.5 millimeters. Further, in exemplary embodiments, each of the plurality of buffer tubes has a compression resistance of greater than or equal to 4.8 N/cm.

In exemplary embodiments, the fibers have a helical bend radius of greater than or equal to 40 mm, such as greater than or equal to 50 mm. Further, in exemplary embodiments, the cable has a coefficient of thermal expansion of less than or equal to $2 \times 10^{-5}/^\circ$ C. and a contraction window in excess of 0.25%.

In accordance with another embodiment a micro-duct cable is provided. The micro-duct cable includes a center member, and a plurality of buffer tubes surrounding the center member. A gel is disposed within each of the plurality of buffer tubes, and a plurality of optical fibers are disposed in each of the plurality of buffer tubes. Each of the plurality of optical buffer tubes has an outer diameter of less than or equal to 3.1 millimeters and an inner diameter of less than or equal to 2.5 millimeters and contains greater than or equal to 48 optical fibers. The micro-duct cable further includes a cable jacket surrounding the plurality of buffer tubes and the center member. A maximum outer diameter of the cable is less than 13 millimeters and a modulus of elasticity of the cable is greater than or equal to 800 kpsi.

In exemplary embodiments, each of the plurality of buffer tubes has an outer diameter of less than or equal to 3.1 millimeters and an inner diameter of less than or equal to 2.5 millimeters. Further, in exemplary embodiments, each of the plurality of buffer tubes has a compression resistance of greater than or equal to 4.8 N/cm.

In exemplary embodiments, the fibers have a helical bend radius of greater than or equal to 40 mm, such as greater than or equal to 50 mm. Further, in exemplary embodiments, the cable has a coefficient of thermal expansion of less than or equal to $2 \times 10^{-5}/^\circ$ C. and a contraction window in excess of 0.25%.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION OF EXEMPLARY EMBODIMENTS

Figure 1:
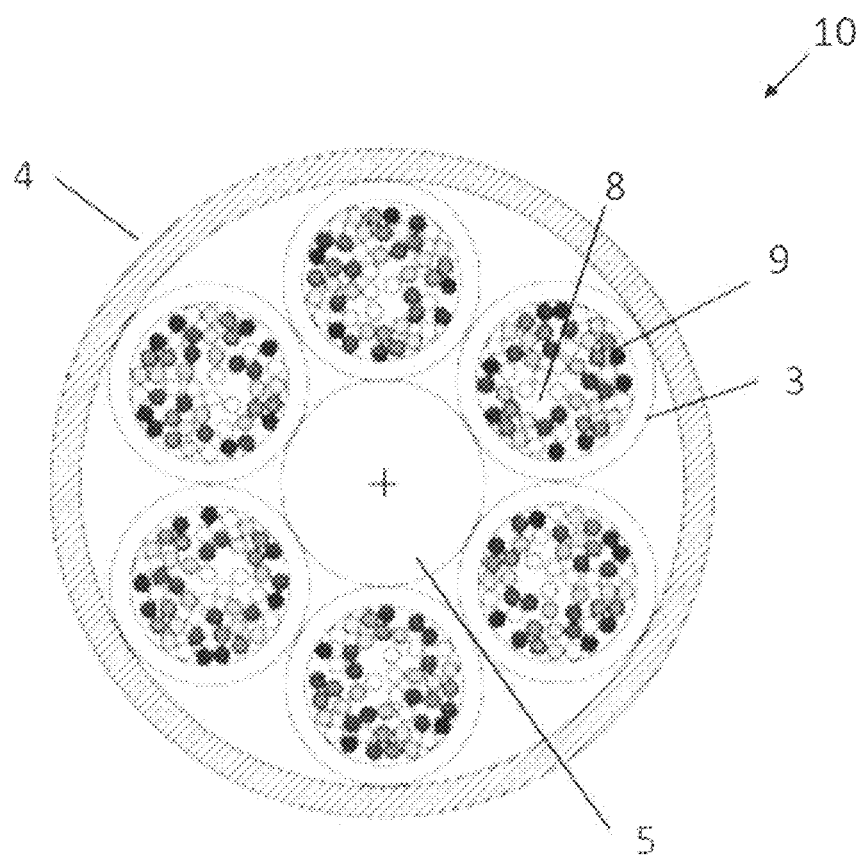
FIG. 1 is a cross-sectional view of a cable according to a first embodiment of the present disclosure.

Hereinafter, exemplary embodiments will be described in greater detail with reference to the accompanying drawings.

In the following description, same reference numerals are used for the same elements when they are depicted in different drawings. Elements are described in detail in order to assist in an understanding of exemplary embodiments. Thus, it is apparent that exemplary embodiments may be carried out without those specifically-defined elements. Detailed descriptions of known elements are omitted for clarity and conciseness.

In a first embodiment, as shown in FIG. 1, an ultra-high fiber density micro-duct cable 10 comprises multiple buffer tubes 3, each of which is configured to contain a plurality of fibers 9 and which may further contain a thixotropic gel 8. For example, a buffer tube may contain greater than or equal to 24 fibers, such as between 24 fibers and 72 fibers, such as in exemplary embodiments 48 fibers per tube. A fiber may be, for example, an optical fiber 9. A buffer tube 3 may, for example, be formed from a polypropylene or polybutylene terephthalate. The buffer tube 3 may be designed to yield a compression resistance greater than 4.8 N/cm. The fibers may be color coded and identified by ring markings or colored thread yarns. The buffer tubes 3 are cabled over a fiberglass reinforced plastic rod or center member 5 with a reversed oscillating lay (ROL) to create a core. The core is constructed so that the fiber bend radius exceeds 50 mm, the cable modulus of elasticity exceeds 800 kpsi, and the fiber strain free window exceeds 0.25%, allowing short term tensile loads exceeding 600 lbs. A layer of polyethylene is extruded over the core to create outer jacket 4. The interior of the outer jacket 4 surrounding the core may be free from fillers such as gels or other tubes, members, etc. The cable 10 is designed to have a coefficient of thermal expansion less than $2 \times 10^{-5}/°$ C. and a contraction window in excess of 0.25%, allowing for operation at −40° C. without significant power loss. For constructions utilizing fibers with 250 micron nominal diameter, the fiber density of the cable 10 may be 3.4 fibers per $mm^2$. Alternatively, cable 10 constructions utilizing fibers with 200 micron nominal diameter may have a fiber density of 4.8 fibers per $mm^2$. Fiber density as utilized herein is the ratio of the number of fibers to the area of a circle that is equal to the outer diameter of the cable 10.

An ultra-high fiber density micro-duct cable consistent with exemplary aspects of the present disclosure may have benefits and advantages including but not limited to the following. The ultra-high density fiber optic micro-duct cable allows the consumer to install a higher fiber count construction into an existing or newly installed duct, without sacrificing performance.

Furthermore, an ultra-high fiber density micro-duct cable may be suitable for use in a 13 mm inner diameter (ID) micro-duct. In order to qualify for use as a suitable 288 fiber count cable which is to be used in a 13 mm ID micro-duct, exemplary experimentation, such as qualification testing, may be conducted. Qualification of the cable is based, for example, on the requirements of Telcordia's GR-20-CORE Issue 4 (GR-20), Generic Requirements for Optical Fiber and Optical Fiber Cable. The following experimental Examples are analyzed with respect to qualification for use in a 13 mm ID micro-duet.

Example 1

Figure 2:
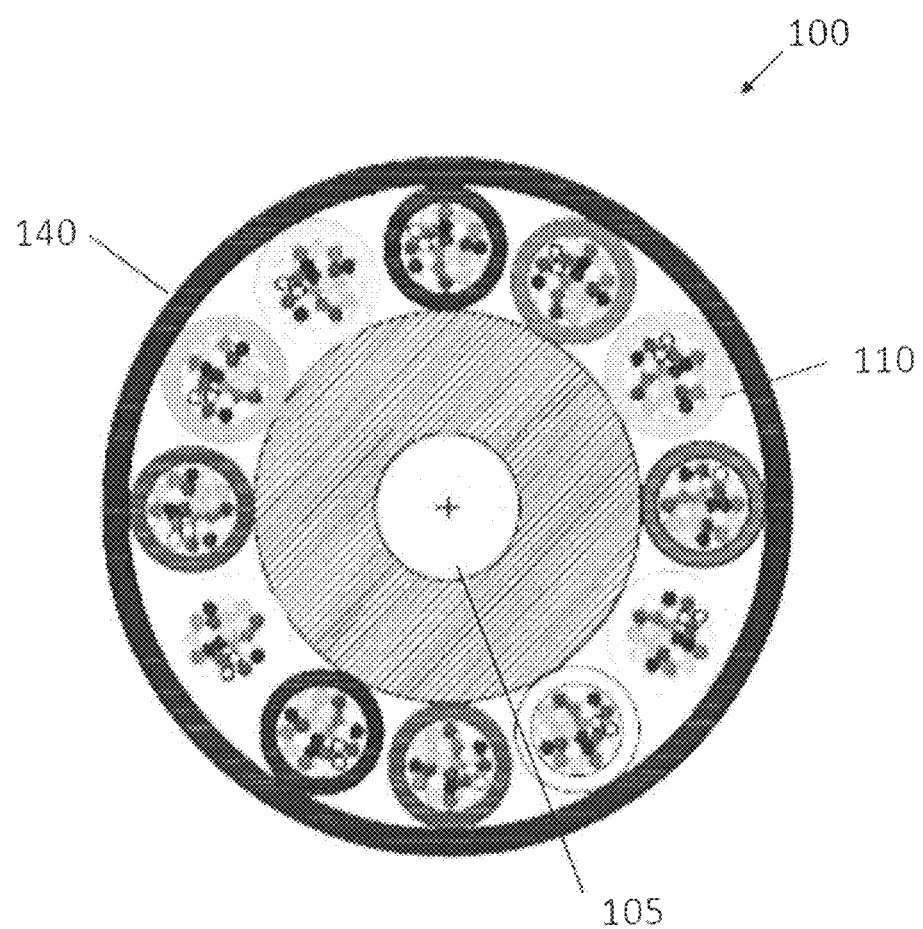
FIG. 2 is a cross-sectional view of a cable according to another embodiment of the present disclosure.

Example 1 is depicted in FIG. 2. A cable 100 of Example 1 is of a 288 f construction. The cable 100 comprises twelve buffer tubes 110, which each contain 24 fibers per tube and a gel. The fibers may be of 250 micron nominal diameter. The buffer tubes 110 are cabled over a center member 105 and collectively covered by an outer jacket 140. The center member 105 includes an inner strength member, such as a fiberglass reinforced plastic rod, and an outer layer or up-jacket of polyethylene that is generally free from fiber reinforcement. The outer diameter of cable 100 may be 12.8 mm, in which case, the cable 100 is typically limited to 15 mm ID micro-ducts.

Example 2

Example 2 is schematically similar to the cable depicted in FIG. 2 and is not separately illustrated. A cable of Example 2 is also of a 288 f construction. The cable comprises twelve buffer tubes, which each contain 24 fibers per tube and a gel, and two filler rods. The buffer tubes and filler rods form a first layer and a second layer. The fibers may be of 250 micron nominal diameter. The buffer tubes are cabled over a center member and collectively covered by an outer jacket. Compared to Example 1, a smaller center member is used. The outer diameter of the cable of Example 2 is 11.2 mm.

Example 3

Figure 3:
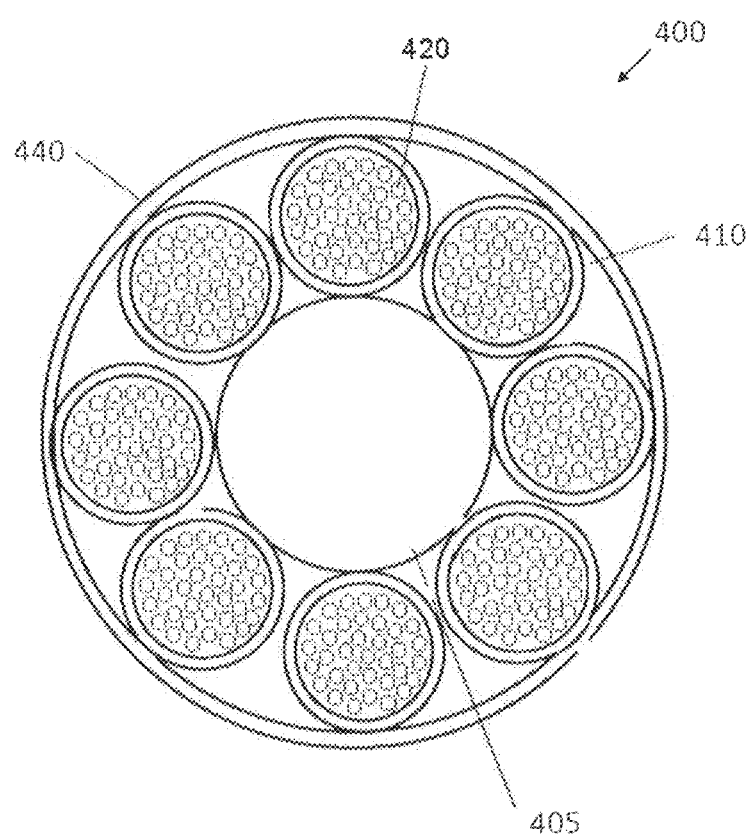
FIG. 3 is a cross-sectional view of a cable according to another embodiment of the present disclosure.

Example 3 is depicted in FIG. 3. A cable 400 of Example 3 is also of a 288 f construction. The cable 400 comprises eight buffer tubes 410, which each contain 36 fibers 420 per tube and a gel. The fibers may be of 250 micron nominal diameter. The buffer tubes 410 are cabled over a center member 405 and collectively covered by an outer jacket 440. The outer diameter of cable 400 is 11.8 mm.

Example 4

Figure 4:
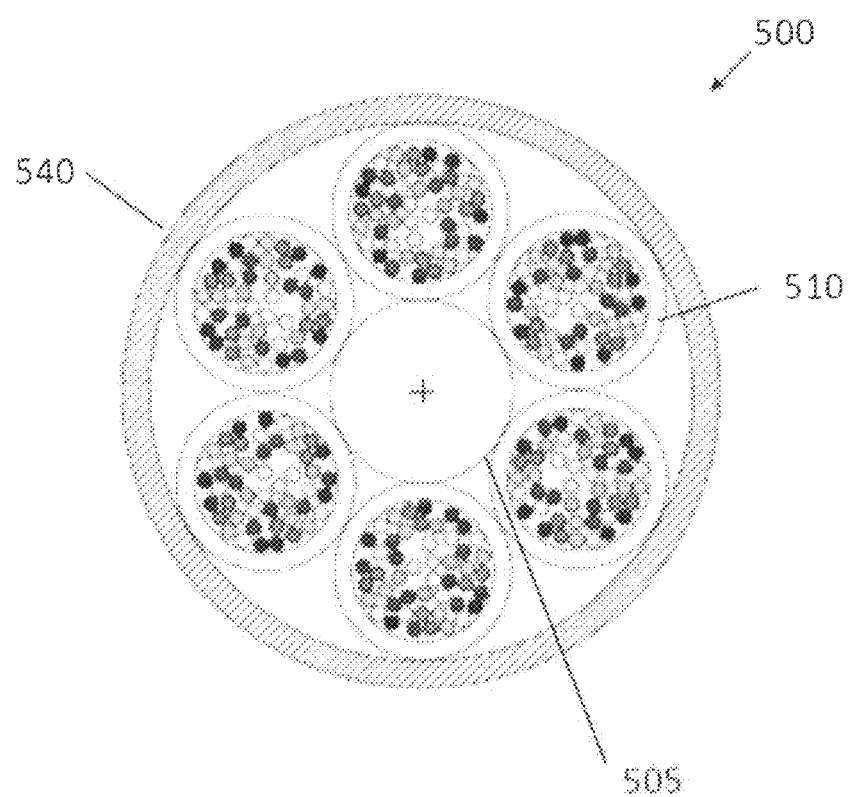
FIG. 4 is a cross-sectional view of a cable according to another embodiment of the present disclosure.

Example 4 is depicted in FIG. 4. A cable 500 of Example 4 is also of a 288 f construction. The cable 500 comprises 3.1 mm outer diameter (OD), 2.5 mm ID, gel filled, polybutylene terephthalate buffer tubes 510. The cable 500 comprises six buffer tubes 510. Each buffer tube 510 contains 48 colored fibers with two options for fiber identification. The first option is to use fibers with ring markings so that fibers #13-24 have one ring, fibers #25-36 have two rings, and fibers #37-48 have three rings. Alternatively, fibers can be grouped into twelves and wrapped with low denier, colored string binder threads. The six buffer tubes 510 are SZ stranded over a central strength member 505 with a lay length that yields an actual fiber helical bend radius of greater than 40 mm, such as greater than 50 mm, and bound with uncoated polyester binders. Two water swell ripcords (not shown) are included under the outer, HDPE jacket 540. The nominal finished cable OD is 10.4 mm and the cable 500 is intended for use in a 13 mm ID duct. The cable 500 can accommodate fibers with 200 micron nominal diameter or fibers with 250 micron nominal diameter.

Example 5

Example 5 is schematically similar to the cable depicted in FIG. 2 and is not separately illustrated. Furthermore, the cable of Example 5 is for accommodating fibers with 200 micron nominal diameter, and thus uses buffer tubes having an inner diameter of 1.6 mm and outer diameter of 2.0 mm. The cable of Example 5 is substantially similar to that of Example 2 except for the size of buffer tubes. Consequently, the outer diameter of the cable of Example 5 is 11.2 mm.

Example 6

Example 6 is schematically similar to the cable depicted in FIG. 3 and is not separately illustrated. Furthermore, the cable of Example 6 is for accommodating fibers with 200 micron nominal diameter, and thus uses buffer tubes having an inner diameter of 1.9 mm and outer diameter of 2.4 mm. The cable of Example 6 is substantially similar to that of Example 3 except for the size of butter tubes and core. Consequently, the outer diameter of the cable of Example 6 is 9.9 mm.

Example 7

Example 7 is schematically similar to the cable depicted in FIG. 4 and is not separately illustrated. Furthermore, the cable of Example 7 accommodates fibers with 200 micron nominal diameter, and uses buffer tubes having an inner diameter of 2.0 mm and outer diameter of 2.5 mm. The cable of Example 7 is substantially similar to that of Example 4 except for the size of buffer tubes and core. Consequently, the outer diameter of the cable of Example 7 is 8.7 mm.

The constructions of the above examples are summarized in the following tables.

TABLE 1

| | Example | | | |
|---|---|---|---|---|
| | 1 | 2 | 3 | 4 |
| Fibers per Tube | 24 | 24 | 36 | 48 |
| # Tubes | 12 | 12 | 8 | 6 |
| Tube Size (OD/ID) (mm) | 2.3/1.8 | 2.3/1.8 | 2.9/2.3 | 3.1/2.5 |
| Core Construction | 12@1 | 10@4@1 | 8@1 | 6@1 |
| Core Outer Layer OD (mm) | 11.8 | 10.2 | 10.8 | 9.4 |
| Cable OD (mm) | 12.8 | 11.2 | 11.8 | 10.4 |
| Duct Fill % (13 mm ID) | 98% | 86% | 91% | 80% |

Table 1 shows tube and core options for accommodating 250 μm OD fibers. Units of Tube Size and Core Outer Layer OD rows are millimeters. It should be noted that due to the fill %, relatively less run time, and need for only a single cabling pass, Example 4 is a preferred construction for an ultra-high fiber density micro-duct cable suitable for use in a 13 mm ID micro-duct.

TABLE 2

| | Example | | | |
|---|---|---|---|---|
| | 4 | 5 | 6 | 7 |
| Fibers per Tube | 48 | 24 | 36 | 48 |
| # Tubes | 6 | 12 | 8 | 6 |
| Tube Size (OD/ID) (mm) | 3.1/2.5 | 2.0/1.6 | 2.4/1.9 | 2.5/2.0 |
| Core Construction | 6@1 | 12@1 | 8@1 | 6@1 |
| Core Outer Layer OD (mm) | 9.4 | 10.2 | 8.9 | 7.7 |
| Cable OD (mm) | 10.4 | 11.2 | 9.9 | 8.7 |
| Duct Fill % (13 mm ID) | 80% | 86% | 76% | 67% |

Table 2 shows tube and core options for accommodating 200 μm OD fibers. Units of Tube Size and Core Outer Layer OD rows are in millimeters. On the basis of Table 2, it can be said that Example 4 is a preferred construction also for 200 μm OD fibers. Examples 6 and 7 also exhibit superior properties.

Testing of cables in accordance with the present disclosure have yielded test results indicating various advantages of the subject cables relative to prior art cables utilized in micro-ducts. In particular, the results discussed herein were performed for a cable as described in Example 4. All tests described herein are in accordance with Telcordia GR-20 specifications.

Mechanical testing of a test cable was performed. For example, fiber strain was measured during application of a 600 pound tensile load in accordance with Telcordia GR-20. The maximum fiber strain was below 0.6% (as required by Telcordia GR-20), such as below 0.3%; such as below 0.2%, such as below 0.15%.

Additionally, compressive strength or crush testing was performed utilizing a 990N load (as required by Telcordia GR-20 for standard, rather than micro-duct, cables). The Telcordia GR-20 limit for maximum change in fiber attenuation during the compressive strength test is ≤ 0.05 dB for 90% of the fibers and ≤ 0.15 dB for any fiber. The test results yielded a maximum change in fiber attenuation of 0.05 dB, 0.04 dB, or 0.02 dB, depending on the fiber type utilized.

Buffer tube kink diameter was also tested. The Telcordia GR-20 limit for buffer tube kink diameter is less than or equal to 40 times the outer diameter of the buffer tube. The test results yielded a buffer tube kink diameter of less than 70 millimeters, which is well within the required limit for the subject cable.

Environmental testing of a test cable was additionally performed. For example, attenuation changes were measured at various temperatures before and after cable aging in accordance with Telcordia GR-20. The Telcordia GR-20 limit for attenuation change is a maximum fiber attenuation change of 0.15 dB/km and a maximum average fiber attenuation change of 0.05 dB/km before cable aging, and a maximum fiber attenuation change of 0.25 dB/km and a maximum average fiber attenuation change of 0.1 dB/km after cable aging. The test results yielded maximum fiber attenuation changes and maximum average fiber attenuation changes during a second −40 degree Celsius exposure before aging of less than 0.15 dB/km, such as less than 0.14 dB/km. The test results further yielded maximum fiber attenuation changes and maximum average fiber attenuation changes during a second −40 degree Celsius exposure after aging of less than 0.1 dB/km, such as less than 0.05 dB/km.

According to the above described exemplary embodiments, various advantages may be obtained, which include but are not limited to the following: as discussed earlier, small diameter, lightweight cables with high fiber density are desired for use in micro-ducts. However, there is a competing requirement for sufficient tensile strength, crush resistance, and the like. The inventors have rigorously studied the field of cables and have determined cables of exemplary embodiments of the instant disclosure satisfy the above needs and are suitable as a 288 fiber count cable which may be used and jetted in a 13 mm ID micro-duct. Cables of exemplary embodiments may exhibit excellent operating performance, specifically, they can sustain high tensile load, have high compression resistance and have wide operating temperature ranges.

The foregoing description of the exemplary embodiments is intended to be illustrative. Many alternatives, modifications, and variations will be apparent to those skilled in the art. Descriptions and features listed in relation to the foregoing exemplary embodiments are not to be construed as limiting the present inventive concept, the scope of which is defined by the following claims.

What is claimed is:

1. A micro-duct cable, comprising:
    a buffer tube; and
    a plurality of optical fibers disposed in the buffer tube,
        wherein the buffer tube has an outer diameter of less than or equal to 3.1 millimeters and an inner diameter of less than or equal to 2.5 millimeters and contains greater than or equal to 48 optical fibers.

2. The micro-duct cable of claim 1, wherein the buffer tube has a compression resistance of greater than or equal to 4.8 N/cm.

3. The micro-duct cable of claim 1, wherein the buffer tube is formed from a polybutylene terephthalate.

4. The micro-duct cable of claim 1, wherein the optical fibers are 250 micron nominal diameter optical fibers.

5. The micro-duct cable of claim 1, wherein the optical fibers are 200 micron nominal diameter optical fibers.

6. The micro-duct cable of claim 1, wherein the buffer tube contains 48 optical fibers.

7. The micro-duct cable of claim 1, wherein the buffer tube contains 72 optical fibers.

8. The micro-duct cable of claim 1, wherein the buffer tube has an outer diameter of 2.9 millimeters.

9. The micro-duct cable of claim 1, wherein the buffer tube has an outer diameter of 2.4 millimeters.

10. The micro-duct cable of claim 1, further comprising a gel disposed within the buffer tube.

11. A micro-duct cable, comprising:
a buffer tube, the buffer tube having a compression resistance of greater than or equal to 4.8 N/cm;
a gel disposed within the buffer tube; and
a plurality of optical fibers disposed in the buffer tube,
wherein the buffer tube has an outer diameter of less than or equal to 3.1 millimeters and an inner diameter of less than or equal to 2.5 millimeters and contains greater than or equal to 48 optical fibers.

12. The micro-duct cable of claim 11, wherein the buffer tube is formed from a polybutylene terephthalate.

13. The micro-duct cable of claim 11, wherein the optical fibers are 250 micron nominal diameter optical fibers.

14. The micro-duct cable of claim 11, wherein the optical fibers are 200 micron nominal diameter optical fibers.

15. The micro-duct cable of claim 11, wherein the buffer tube contains 48 optical fibers.

16. The micro-duct cable of claim 11, wherein the buffer tube contains 72 optical fibers.

17. The micro-duct cable of claim 11, wherein the buffer tube has an outer diameter of 2.9 millimeters.

18. The micro-duct cable of claim 11, wherein the buffer tube has an outer diameter of 2.4 millimeters.

* * * * *